US007437872B2

(12) United States Patent
Kim et al.

(10) Patent No.: US 7,437,872 B2
(45) Date of Patent: Oct. 21, 2008

(54) OBJECT SEPARATING APPARATUS USING GAS

(75) Inventors: Heung-Youl Kim, Daejeon (KR); Yong-Bum Jun, Daejeon (KR); Sang-Hwa Kim, Daejeon (KR)

(73) Assignee: Agency for Defense Development (KR)

( * ) Notice: Subject to any disclaimer, the term of this patent is extended or adjusted under 35 U.S.C. 154(b) by 102 days.

(21) Appl. No.: 11/391,769

(22) Filed: Mar. 28, 2006

(65) Prior Publication Data

US 2007/0186547 A1 Aug. 16, 2007

(30) Foreign Application Priority Data

Feb. 15, 2006 (KR) ...................... 10-2006-0014822

(51) Int. Cl.
*F16D 31/02* (2006.01)
*F15B 21/00* (2006.01)
*F15B 15/26* (2006.01)

(52) U.S. Cl. .................................... 60/412; 91/5; 92/24

(58) Field of Classification Search .................. 60/407, 60/412; 91/5; 92/14, 15, 23, 24
See application file for complete search history.

(56) References Cited

U.S. PATENT DOCUMENTS 4,458,645 A * 7/1984 Schwartzman ................. 92/14
2007/0186701 A1* 8/2007 Kim et al. ...................... 74/111

* cited by examiner

*Primary Examiner*—Michael Leslie
(74) *Attorney, Agent, or Firm*—Ostrolenk, Faber, Gerb & Soffen, LLP

(57) ABSTRACT

An object separating apparatus uses gas and has a hollow housing with a closed end connected to a first object, and an opened end. An axially movable cylinder is installed at an inner space of the housing and a piston assembly is coupled to the cylinder and connected to a second object at an outer end. A fixing portion between the housing and the cylinder and the piston assembly fixes the cylinder and the piston assembly into the housing. A gas generator communicates with the inner space, wherein when the gas generator is operated, the gas generator pressurizes the cylinder to release the cylinder from the piston assembly and to separate the cylinder and the piston assembly from the housing.

4 Claims, 6 Drawing Sheets

OBJECT SEPARATING APPARATUS USING GAS

BACKGROUND OF THE INVENTION

1. Field of the Invention

The present invention relates to an object separating apparatus using gas, and particularly, to an object separating apparatus using gas for forcibly separating two objects coupled to each other from each other out of a safety distance.

2. Background of the Invention

In general, a system for separating a guided missile from a launcher platform in land or on ship uses an explosive bolt. Namely, the guided missile is connected (e.g., restricted) to the launcher platform by the explosive bolt, and is instantaneously separated from the launcher platform. The explosive bolt connects and disconnects two objects coupled to each other. In a guided weapon system, the explosive bolt is used in order to simply separate the guided missile from the launcher platform. The guided missile separated from the launcher platform is forcibly moved to a certain safety distance by a thrust of a propellant.

Since the explosive bolt simply separates the two objects coupled to each other from each other, an additional device for compulsorily moving the objects to a safety distance is required.

A gas generator is generally used as the additional device. However, in order to use a pressure of the gas generator, a certain sealing space is necessary and thus a space efficiency is degraded.

In addition, in order to operate both the gas generator and the explosive bolt, each power source line therefor has to be designed, and accordingly an entire system becomes complicated, resulting in a degradation of reliability of the entire system.

SUMMARY OF THE INVENTION

Therefore, an object of the present invention is to provide an object separating apparatus using gas in which two objects coupled to each other can be separated from each other and then spaced from each other by a certain safety distance using a simple construction.

To achieve these and other advantages and in accordance with the purpose of the present invention, as embodied and broadly described herein, there is provided an object separating apparatus using gas comprising a housing, a cylinder and a piston assembly disposed within the housing, a fixing portion used to fix the cylinder and the piston assembly into the housing, and a gas generator to release the fixed state between the cylinder and the piston assembly and to separate the cylinder and the piston assembly from the housing.

The housing has a hollow shape. One end of the housing is opened and its closed end is connected to a first object. The cylinder is movably installed at an inner space of the housing in an axial direction of the housing. The piston assembly is connected to the cylinder at the inner space of the housing, and an end thereof which is exposed to the outside of the housing is connected to a second object. The fixing portion fixes the cylinder and the piston assembly into the housing to thus maintain the coupled state between the first object and the second object. The fixing portion includes a plurality of stopping balls disposed in a plurality of receiving holes of the piston assembly so as to be inserted into a ball groove formed at a support portion of the housing, and an elastic body disposed between the piston assembly and the cylinder to pressurize the cylinder into which the inner end of the piston assembly is inserted toward the closed end of the housing to thus prevent the stopping balls from being separated from the ball groove. In addition, as a space portion having an inner diameter greater than that of the pressurizing portion is formed at an inner circumference of the cylinder, when the gas generator is operated to thus push the cylinder toward the piston assembly, the plurality of stopping balls are moved to the space portion. Accordingly, the plurality of stopping balls are fixed into the ball groove to thus release the fixed state of the piston assembly, thereby separating the cylinder and the piston assembly from the housing. The first object connected to the housing is thus separated from the second object connected to the piston assembly. In this way, a simple construction is used to certainly separate one of the first and second objects from the other.

In addition, the piston assembly may be formed by assembling a plurality of components rather than formed using a single component. The piston assembly accordingly includes a piston coupled to the support portion of the housing, a coupling portion connected to the second object, and a connecting portion screw-coupled between the piston and the coupling portion. As the connecting portion is screw-coupled respectively to the piston and the coupling portion, an interval between the piston and the coupling portion can be adjusted, so as to flexibly cope with an assembly tolerance generated in assembly accordingly.

Also, a bushing protruding toward left and right sides in the axial direction of the housing with inclined surfaces can be inserted into the opened end of the housing, whereby the piston assembly can be coupled to the cylinder by being rotated centering around a line perpendicular to the axis of the housing so as to flexibly cope with the assembly tolerance generated in the assembling process.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Figure 1:
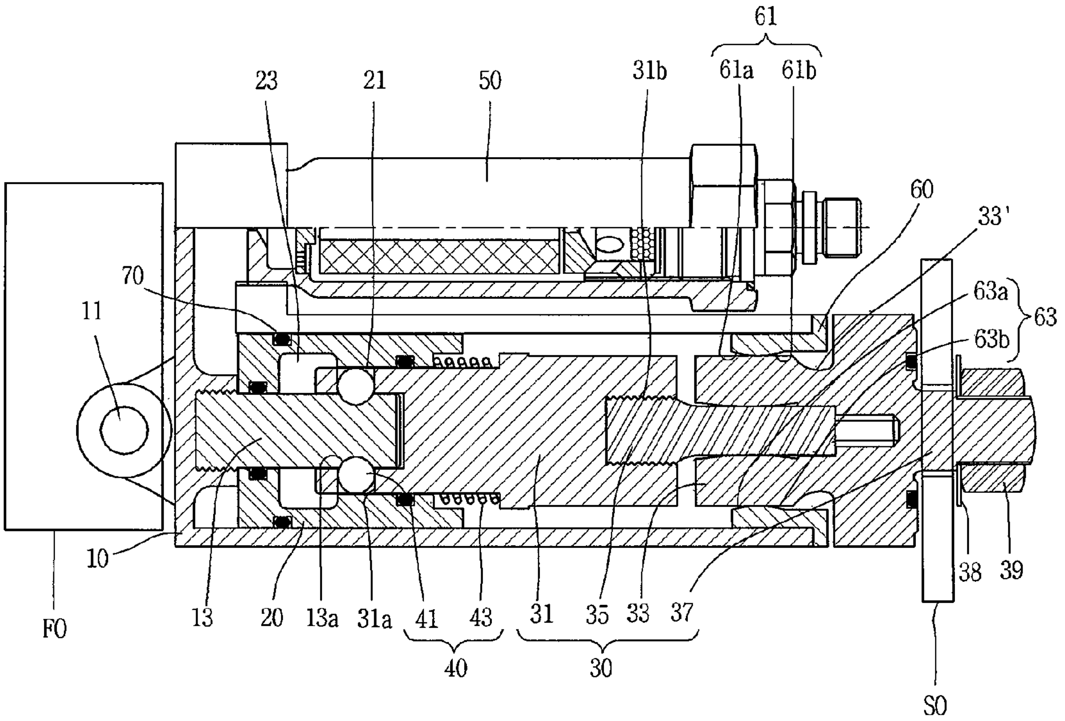
FIG. 1 is a sectional view illustrating an object separating apparatus using gas in accordance with an embodiment of the present invention.

FIG. 1 is a sectional view illustrating an object separating apparatus using gas in accordance with an embodiment of the present invention.

As illustrated in FIG. 1, an object separating apparatus using gas in accordance with an embodiment of the present invention includes a housing 10, a cylinder 20, a piston assembly 30, a fixing portion 40 and a gas generator 50.

The housing 10 has a hollow shape extending toward a longitudinal direction. One end of the housing 10 is closed and the other end is opened. A coupling portion 11 is formed at the closed end, and a first object (not shown) is connected to the housing 10 via the coupling portion 11. A support portion 13 is integrally formed with the closed end or coupled thereto, wherein the support portion 13 has a circular section and protrudes toward an inner space of the housing 10. A ball groove 13*a* is formed at an outer circumference of the support portion 13 in a circumferential direction.

The cylinder 20 is movably disposed at the inner space of the housing in an axial direction of the housing 10. The cylinder 20 has a hollow shape, and its inner circumference is processed with two steps. In other words, the cylinder 20 includes a pressurizing portion 21 and a space portion 23 stepped to have an inner diameter greater than that of the pressurizing portion 21.

An end of the piston assembly 30 is coupled to the cylinder 20, and an end exposed to the outside of the housing 10 is connected to a second object (not shown). The piston assembly 30 is equipped with a piston 31, a coupling portion 33 and a connecting portion 35. However, the piston assembly 30 may be formed by assembling separate components or may be integrally formed.

One end or an inner end of the piston 31 is formed in a hollow shape in order to insert the support portion 13 therein. In addition, a plurality of receiving holes 31*a* corresponding to the ball groove 13*a* are formed at the inner end of the piston 31, the plurality of receiving holes 31*a* being spaced from one another. The other end of the piston 31 has a hollow shape and thus the connecting portion 35 is inserted therein to be coupled thereto by a screw. A female screw portion 31*b* is formed at an inner circumference of a hollow portion (or a certain groove).

One end of the coupling portion 33 has a hollow shape and thus the connecting portion 35 is inserted therein to be coupled thereto by a screw. A coupling screw 37 is protrudingly formed at the other end of the coupling portion 33 so that a second object (not shown) is coupled thereto. In order for the second object to be fixed to the coupling screw 37, a washer 38 and a bolt 39 are provided to the coupling screw 37. Furthermore, a rotary groove 33' extending in a circumferential direction of the coupling portion 33 is formed at a portion of the coupling portion 33 where is adjacent to the opened end of the housing 10.

The connecting portion 35 is disposed between the piston 31 and the coupling portion 33 for connection therebetween. a male screw portion (not shown) is respectively formed at both ends of the connecting portion 35. Accordingly, one male screw portion of one end of the connecting portion 35 is coupled to the female screw portion 31*b* of the piston 31 by a screw, while the other male screw portion of the other end of the connecting portion 35 is coupled to the female screw portion of the coupling portion 33 by a screw.

The fixing portion 40 is disposed between the housing 10 and the cylinder 20 and the piston assembly 30. Accordingly, the cylinder 20 and the piston assembly 30 keep being fixed into the inner space of the housing 10. The fixing portion 40 includes the support portion 13 having the ball grooves 13*a* therein, stopping balls 41 arranged in the receiving groove 31*a* of the piston 31, respectively, to thus couple the piston 31 to the support portion 13 by being mounted in the ball groove 13*a*, and an elastic body 43 for pressurizing the cylinder 20 toward the closed end of the housing 10 to allow the pressurizing portion 21 to pressurize the stopping balls 41. The elastic bodies 43 are disposed to cover an outer circumference of the inner end of the piston 31 and simultaneously supported by the piston 31 to thus elastically support an end of the cylinder 20 adjacent to the piston 31 toward the closed end of the housing 10.

The gas generator 50 is integrally coupled to an outside of the housing 10, and communicated with the inner space of the housing 10 to thus enable the scattering of a high pressure gas toward the inner space of the housing 10.

The object separating apparatus using the gas according to the one embodiment of the present invention can further include a bushing 60 inserted into the housing 10 to thus be positioned between the housing 10 and the piston assembly 30.

The annular bushing 60 is inserted into the opened end of the housing 10 to thus be in contact with an inner circumferential surface of the housing 10. The bushing 60 is provided with rotary protrusions 61 and 63 which protrude toward a central axis of the housing 10. Left inclined portions 61*a* and 63*a* and right inclined portions 61*b* and 63*b* are inclinedly formed respectively at left and right sides of the rotary protrusions 61 and 63 based upon the axis of the housing 10.

In addition, an O-ring is respectively coupled to an outer circumference of the cylinder 20 which is slidable with an inner circumference of the housing 10, to an outer circumference of the piston 31 which is slidable with an inner circumference of the cylinder, or the like, to thus maintain a sealed state therebetween.

An assembling process of the object separating apparatus using gas in accordance with the one embodiment of the present invention will be explained with reference to FIGS. 1 and 2.

Figure 2:
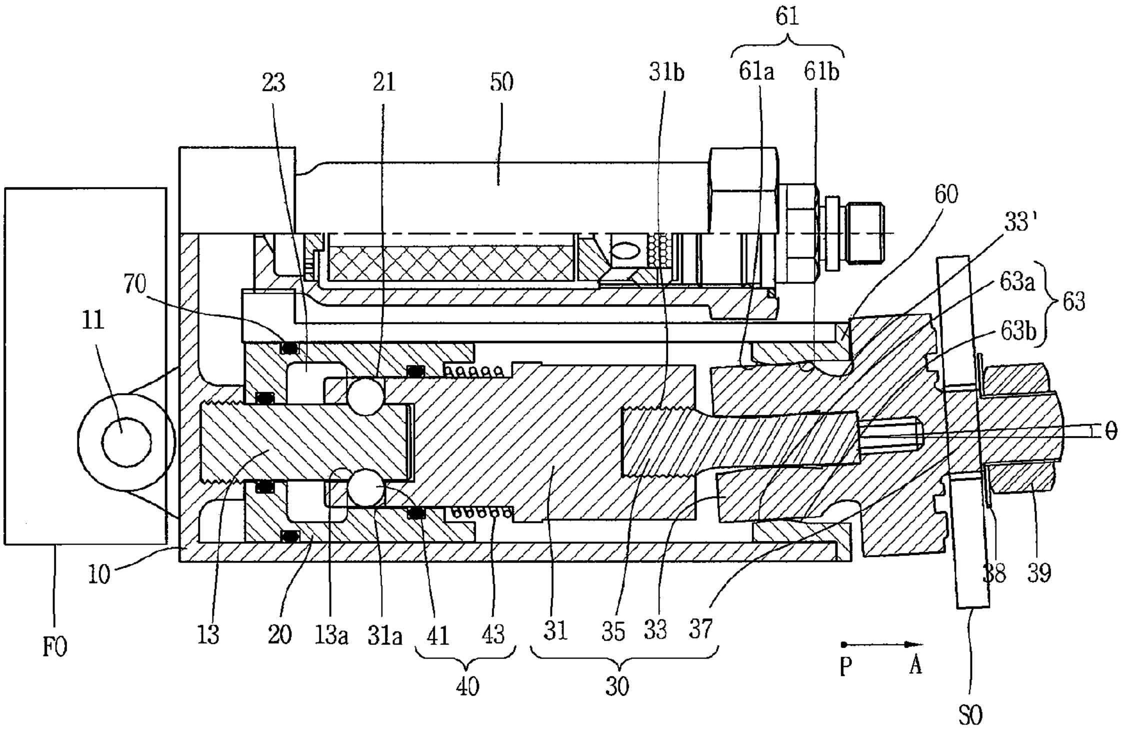
FIG. 2 is a sectional view illustrating a method for assembling a coupling unit constituting a piston assembly of FIG. 1.

FIG. 2 is a sectional view illustrating a method for assembling the coupling portion constituting the piston assembly of FIG. 1.

First, the elastic body 43 is inserted into one end of the piston 31.

Then, the support portion 13 is inserted into the one end of the piston 31. The ball groove 13*a* of the support portion 13 is accorded with the receiving holes 31*a* of the piston 31 so as to mount the stopping balls 41 therein.

The cylinder 20 is coupled to the piston 31 in a state that one end of the piston 31 is inserted into the cylinder 20 to allow the pressurizing portion 21 of the cylinder 20 to pressurize the stopping balls 41 received in the receiving holes 31*a* toward the ball groove 13*a*.

The assembly constituted with the support portion 13, the cylinder 20 and the piston 31 is then inserted into the inner space of the housing 10 through the opened end thereof to thus be rotated. Accordingly, the support portion 13 is coupled to the closed end of the housing by a screw with being rotated.

Next, the bushing 60 is inserted so as to be in contact with the inner circumferential surface of the housing 10 through the opened end of the housing 10.

Afterwards, the coupling portion 33 which is connected to the second object is coupled to one end of the connecting portion 35 by a screw to thus be coupled to the piston 31 in a manner that the other end of the connecting portion 35 is coupled to the female screw portion 31*b* of the piston 31 by a screw. Here, it is possible to control a degree of the connecting portion 35's being coupled to the piston 31 by the screw depending on an assembly tolerance.

In assembling the coupling portion 33, in addition, when the coupling portion 33 is not arranged with the piston 31 in the axial direction of the housing 10, the coupling portion 33 can be rotated within a certain angle range θ centering around a virtual line which is perpendicular to the axis of the housing 10. Accordingly, as illustrated in FIG. 2, the coupling portion 33 is rotated in order to be supported by the right inclined portion 61*b* of the rotary protrusion 61 at an upper portion of the bushing 60 and to be supported by the left inclined portion 63*a* of the rotary protrusion 63 at a lower portion of the bushing 60, or vice versa. While rotating, the coupling portion 33 can avoid an interruption with the opened end of the housing 10 by the rotary groove 33'.

Then, the gas generator 50 is disposed outside the housing 10 to thereafter be electrically connected to an external controlling unit (not shown).

An operation method of the object separating apparatus using gas in accordance with the one embodiment of the present invention will now be explained with reference to FIGS. 1, and 3 through 6.

As illustrated in FIG. 1, the piston 31 is coupled to the support portion 13 which is coupled to the housing 10 by the fixing portion 40 constituted with the stopping balls 41 and the like. The cylinder 20 is disposed to cover the piston 31. The pressurizing portion 21 of the cylinder 20 pressurizes the stopping balls 41 to thus maintain the state that the stopping balls 41 are mounted in the receiving holes 31*a* and the ball groove 13*a*. In such arranged state, the gas generator 50 electrically connected to the controlling unit is operated according to a command of the controlling unit.

Figure 3:
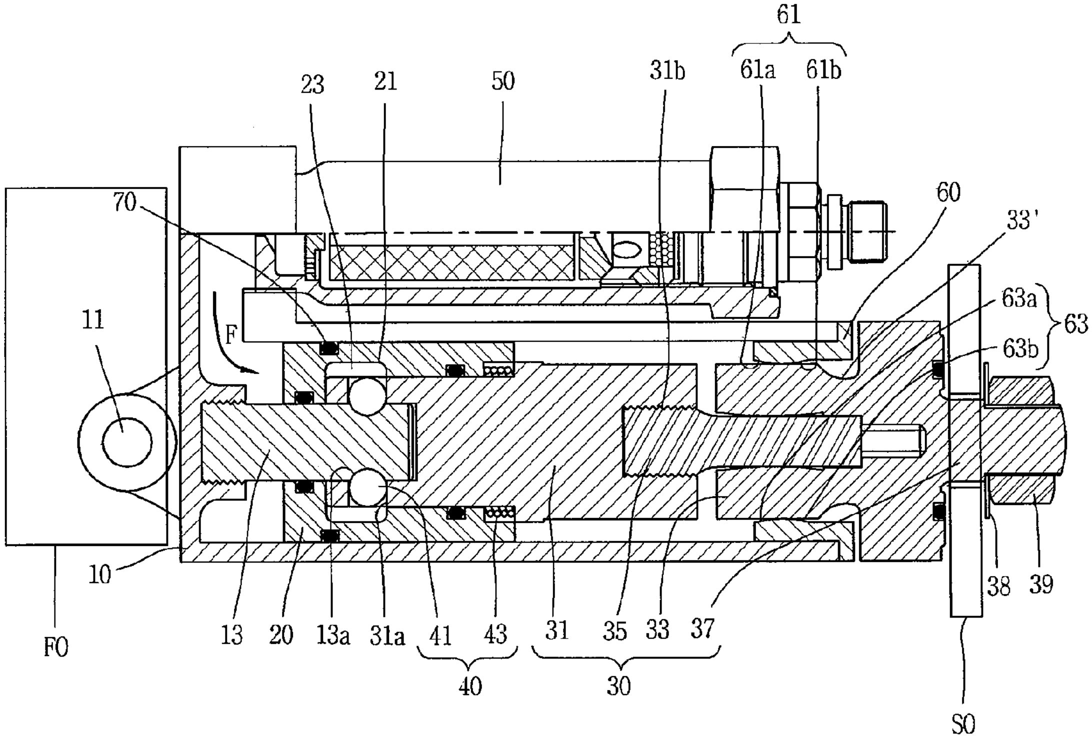
FIG. 3 is a sectional view illustrating a state before a cylinder which has received a pressure from a gas generator pushes a piston.

FIG. 3 is a sectional view illustrating a state before a cylinder which has received a pressure from a gas generator pushes a piston.

As illustrated in FIG. 3, a high pressure gas generated by the gas generator 50 is scattered through the inner space of the housing 10. The gas flow F pressurizes the cylinder 20. Accordingly, the cylinder 20 is moved toward the opened end of the housing 10 in the axial direction of the housing 10 with being slide-frictional to the support portion 13. The movement of the cylinder 20 contracts the elastic body 43, and thus the end of the cylinder 20 is in contact with a portion supporting the elastic body 43 of the piston 31.

Figure 4:
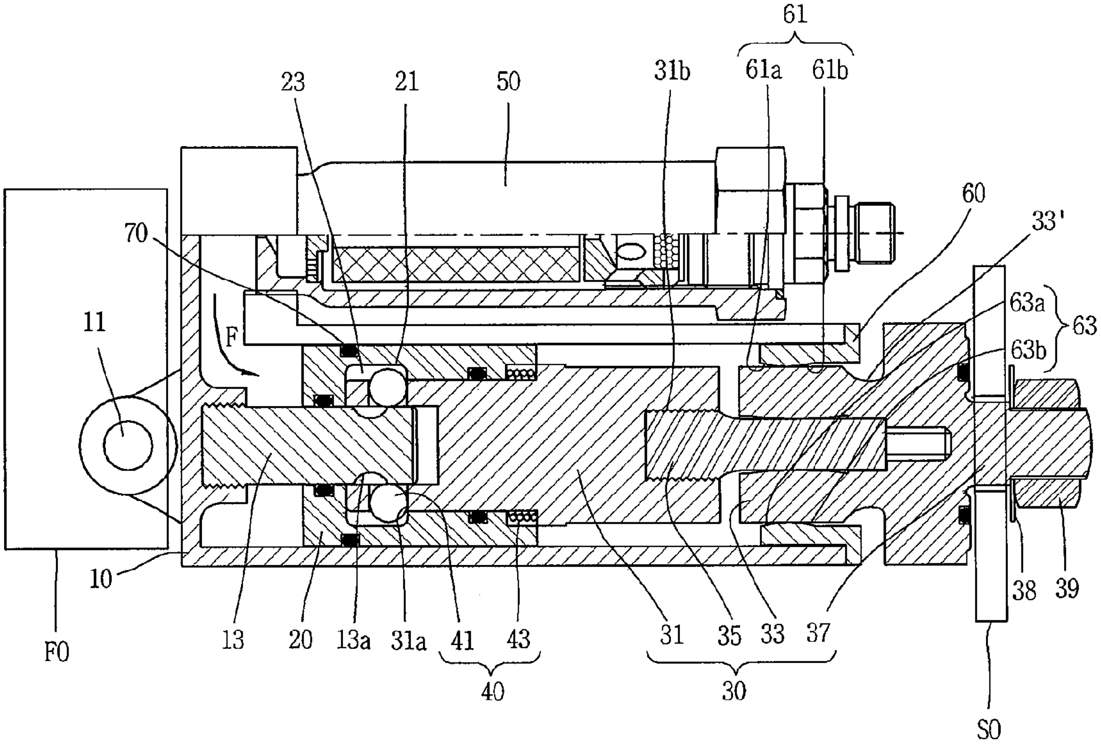
FIG. 4 is a sectional view illustrating changes in positions of stopping balls just after the cylinder pushes a certain portion of the piston in an axial direction.

FIG. 4 is a sectional view illustrating changes in positions of stopping balls just after a cylinder pushes a certain portion of a piston in an axial direction.

As illustrated in FIG. 4 as the cylinder 20 is more pushed by the flow F of the gas generated from the gas generator 50, the stopping balls 41 are separated from the ball groove 13*a* of the support portion 13 by the piston which is moved in the axial direction. The separation provides a space into which the space portion 23 formed together with the pressurizing portion 21 of the cylinder 20 can be separated. As the stopping balls 41 are separated from the receiving groove 31*a* and the ball groove 13*a,* namely, as the received state of the stopping balls 41 are released, the coupled state between the piston 31 and the support portion 13 is released.

Figure 5:
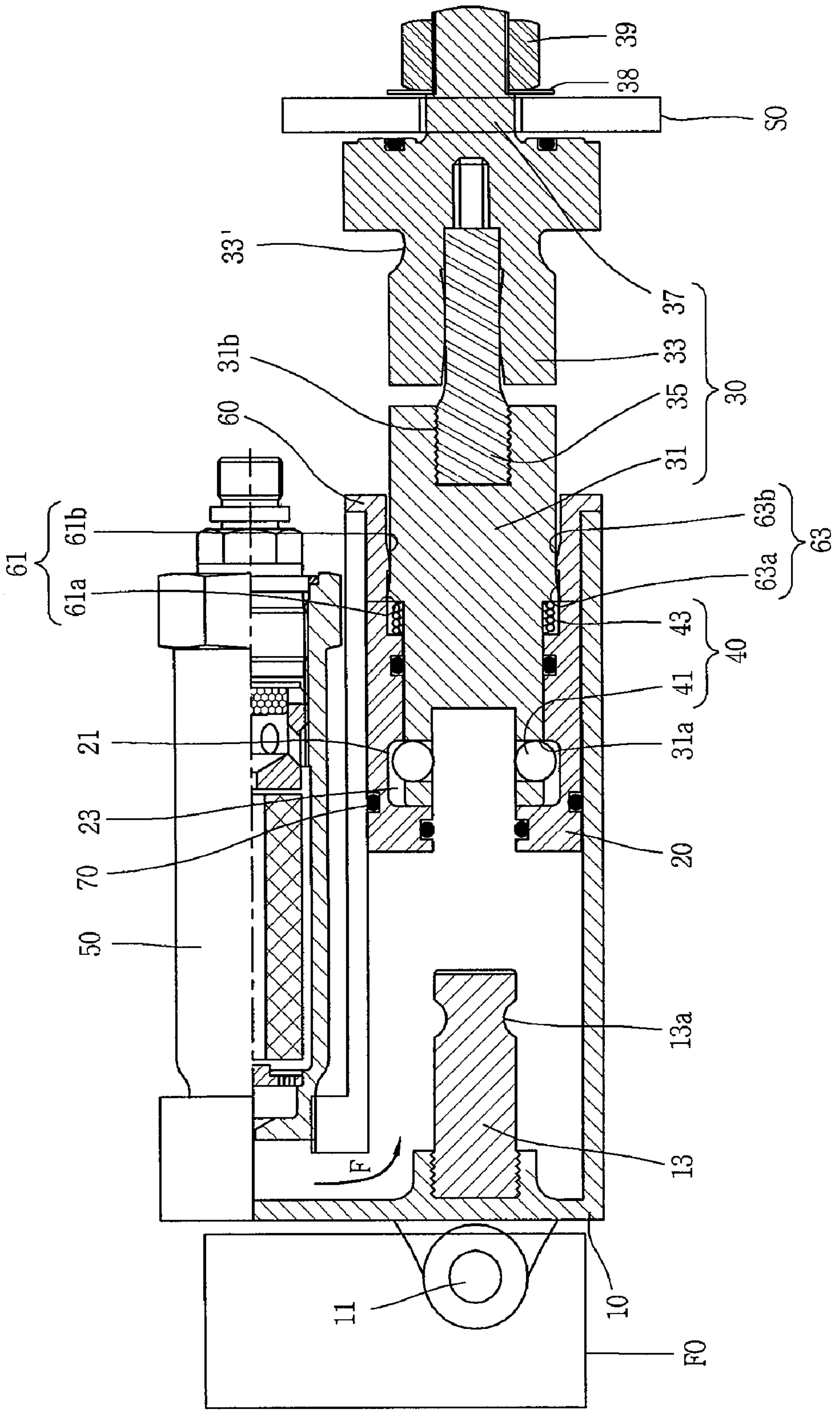
FIG. 5 is a sectional view illustrating a state before the cylinder pushes a bushing.

FIG. 5 is a sectional view illustrating a state just before a cylinder pushes a bushing.

As illustrated in FIG. 5, the cylinder 20 and the piston 31 (i.e., the piston assembly 30) are more moved toward the opened end of the housing 10 in the axial direction according to the continuous flow F of the gas supplied from the gas generator 50. Accordingly, the one end of the cylinder 20 is in contact with the bushing 60 inserted into the opened end of the housing 10.

Figure 6:
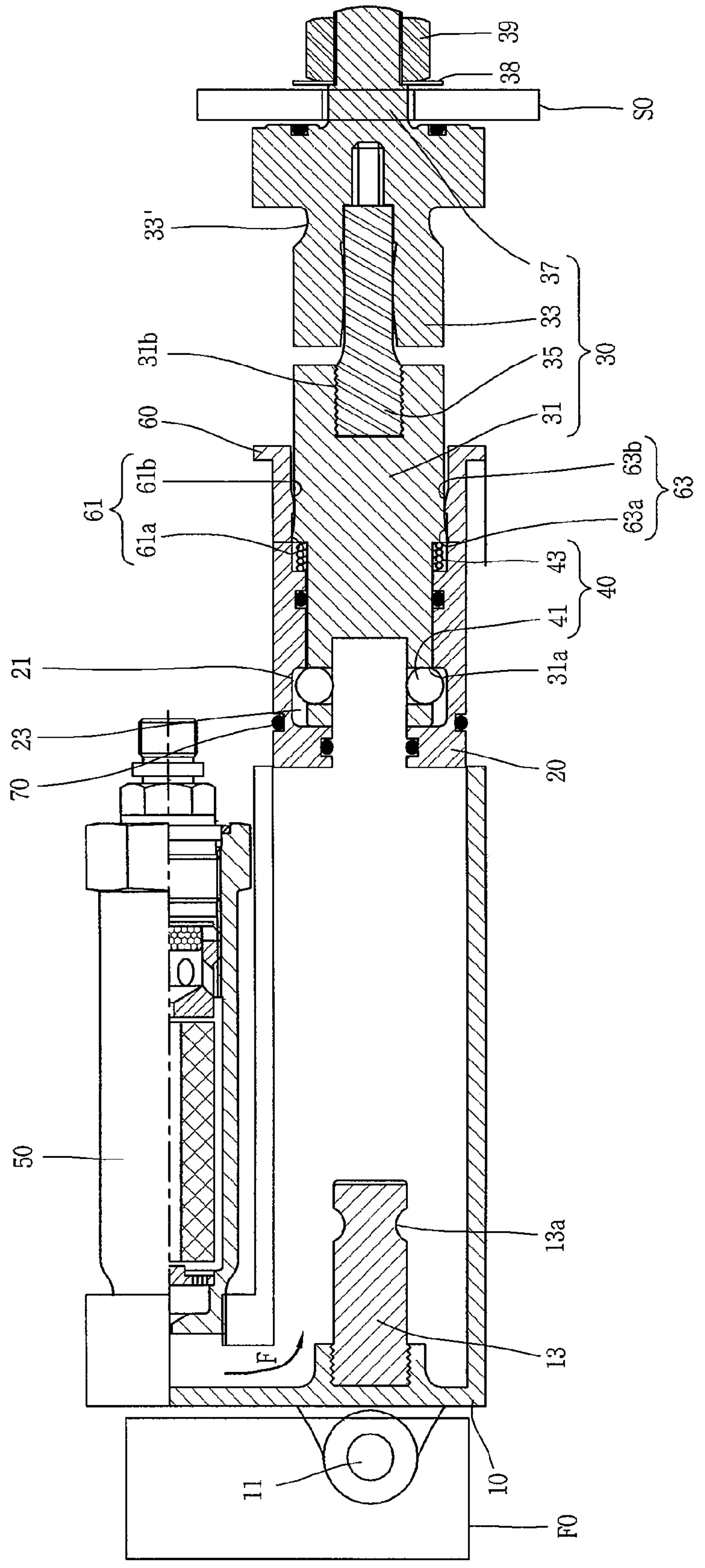
FIG. 6 is a sectional view illustrating a state in which the cylinder and the piston assembly are completely separated from a housing.

FIG. 6 is a sectional view illustrating a state that a cylinder and a piston assembly are completely separated from a housing.

As illustrated in FIG. 6, the continuous gas flow F even allows the bushing 60 as well as the piston assembly 30 to be separated to the outside of the housing 10 by the pushing of the cylinder 20. In other words, one assembly constituted with the housing 10 and the gas generator 50 can be completely separated from another assembly constituted with the cylinder 20, the piston assembly 30, the fixing portion 40 and the bushing 60. Accordingly, the first object connected to the housing 10 and the second object connected to the piston assembly 30 are changed from the coupled state therebetween (i.e., the state illustrated in FIG. 1) into the separated state (i.e., the state illustrated in FIG. 6) by use of the object separating apparatus using the gas according to the present invention.

As aforementioned, regarding the object separating apparatus using the gas according to the present invention, the gas generator is integrally formed with the housing and is constructed to be communicated with the inner space of the housing to thus allow the separate sealed space for the gas generator not to be formed, resulting in an increase in a space efficiency.

In addition, the stopping balls are used to couple the piston assembly to the support portion to connect the first object with the second object, and such coupling is released by the pressure of the gas generated when operating the gas generator, such that the related art explosive bolt is not required. Accordingly, because electrical components for controlling the explosive bolt are not required, the entire system can be simplified more, thereby increasing reliability of the entire system.

Also, when the piston assembly is constituted with a plurality of components which are then assembled, the piston assembly is allowed to be rotated in the axial direction of the housing and in the direction perpendicular to the axial direction, whereby it is possible to flexibly cope with a tolerance accumulation generated in the assembling process.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An object separating apparatus using gas, comprising:

a hollow housing of which closed end is connected to a first object and the other end is opened;

a cylinder movably installed at an inner space of the housing in an axial direction of the housing;

a piston assembly coupled to the cylinder at the inner space and connected to a second object at an outer end thereof where is exposed to the outside of the housing;

a fixing portion disposed between the housing and the cylinder and the piston assembly to fix the cylinder and the piston assembly into the housing; and a gas generator mounted on the housing to be communicated with the inner space, wherein when the gas generator is operated, the gas generator pressurizes the cylinder so as to release the fixed state between the cylinder and the piston assembly by the fixing portion and to simultaneously separate the cylinder and the piston assembly from the housing, wherein the fixing portion includes:

a support portion protruding from the closed end of the housing toward the inner space and having a ball groove at an outer circumferential surface thereof;

a plurality of stopping balls arranged in a plurality of receiving holes which are formed in a circumferential direction of an inner end of the piston assembly into which the support portion is inserted, and mounted in the ball groove; and an elastic body disposed between the piston assembly and the cylinder to pressurize the cylinder into which the inner end of the piston assembly is inserted toward the closed end of the housing to thus prevent the stopping balls from being separated from the ball groove.

2. The apparatus of claim 1, wherein an inner circumference of the cylinder is provided with:

a pressurizing portion formed to make sliding contact with an outer circumference of the inner end of the piston assembly so as to pressurize the stopping balls toward the ball groove; and a space portion formed to have an inner diameter greater than that of the pressurizing portion, wherein when moving in a direction of being separated from the housing, the space portion allows the stopping balls to be separated from the ball groove.

3. The apparatus of claim 1, wherein the piston assembly includes:

a piston coupled to the support portion;

a coupling portion connected to the second object; and a connecting portion disposed between the piston and the coupling portion to thus be coupled to each of the piston and the coupling portion.

4. The apparatus of claim 1, further comprising:

a bushing protrudingly-inserted into the inner circumference of the opened end of the housing with an inclined surface to allow the piston assembly to be assembled with being rotated centering around an axis perpendicular to the axis of the housing.

* * * * *